United States Patent [19]

Blain et al.

[11] Patent Number: 4,630,111
[45] Date of Patent: Dec. 16, 1986

[54] IMAGE DISTORTION CORRECTION SYSTEM FOR ELECTRO-OPTIC SENSORS

[75] Inventors: William Blain; Alexander McKeand; William H. McKendrick, all of Edinburgh, Scotland

[73] Assignee: Ferranti plc, Cheshire, England

[21] Appl. No.: 666,374

[22] Filed: Oct. 30, 1984

[30] Foreign Application Priority Data

Nov. 4, 1983 [GB] United Kingdom ............... 8329459

[51] Int. Cl.⁴ .............................................. H04N 7/18
[52] U.S. Cl. ..................................... 358/109; 358/160; 358/903
[58] Field of Search ............... 358/109, 140, 160, 903; 355/47, 52; 364/522

[56] References Cited

U.S. PATENT DOCUMENTS

| | | | |
|---|---|---|---|
| 3,564,133 | 2/1971 | Hobrough | 355/52 |
| 3,632,870 | 1/1972 | Henderson | 358/109 |
| 3,915,569 | 10/1975 | Pölzleitner | 355/52 |
| 4,463,380 | 7/1984 | Hooks | 358/903 |
| 4,485,409 | 11/1984 | Schumacher | 358/294 |
| 4,496,972 | 1/1985 | Lippmann | 358/109 |
| 4,551,752 | 11/1985 | Wall | 358/140 |

FOREIGN PATENT DOCUMENTS

| | | |
|---|---|---|
| WO83/0351 | 10/1983 | Pct Int'l Appl. . |
| 1472346 | 5/1977 | United Kingdom . |
| 1478406 | 6/1977 | United Kingdom . |
| 1564999 | 4/1980 | United Kingdom . |
| 2097625 | 11/1982 | United Kingdom . |

Primary Examiner—Howard W. Britton
Attorney, Agent, or Firm—Kerkam, Stowell, Kondracki & Clarke

[57] ABSTRACT

A system for providing a view of a scene scanned by an electro-optic framing sensor (30) includes control means (36) operable to cause the sensor to scan the scene in a number of frames each of which is viewed at a different viewing angle. Pickoff means (37) provide signals representing that viewing angle. Storage means (32) are provided to store the image information derived from each frame. Circuit means (33) are provided to transform the image information in each store (32) so as to remove distortions due to the different viewing angles, and the transformed image information is stored in a picture store (34). The contents of the picture store represent a view of the scene as viewed from a predetermined viewing angle.

6 Claims, 6 Drawing Figures

IMAGE DISTORTION CORRECTION SYSTEM FOR ELECTRO-OPTIC SENSORS

This invention relates to an image correction system for use with electro-optics framing sensors.

Electro-optic framing sensors may take a number of forms, the most common being television cameras and thermal imagers. These may be used in a wide variety of applications. One particular application in which problems occur is when generating images of a large area. It is possible to use a sensor having wide field of view, but then the definition within that field of view is frequently not good enough for many purposes. The alternative therefore is to provide a sensor having a narrow field of view, and hence higher definition. The area to be viewed may then be covered by moving the sensor so as to produce an image of a number of overlapping areas in succession. This situation may be met, for example, if the sensor is mounted in an aircraft and moved in a direction perpendicular to the direction of flight. Those areas viewed at a more oblique angle will be distorted relative to those viewed less obliquely, and it will not be possible to simply combine the images generated. A certain amount of image distortion correction will be necessary.

It is an object of the invention to provide an image correction system for use with an electro-optic sensor.

According to the present invention there is provided an image correction system for providing a view of a scene scanned by an electro-optic framing sensor, which includes control means operable to cause the sensor to scan the scene in a number of separate frames each of which is viewed by the sensor at a different viewing angle relative to a set of datum axes, pickoff means associated with the sensor to produce signals representing the viewing angle of each frame, storage means operable to store the image information derived from each of said frames, circuit means operable to transform the image information contained in each storage means so as to remove distortions caused by the different viewing angles, and a picture store operable to store the transformed image information from each frame of the scan such that the contents of the picture store represents a view of the entire scene from a predetermined position.

The invention will now be described with reference to the accompanying drawings, in which.

Figure 1:
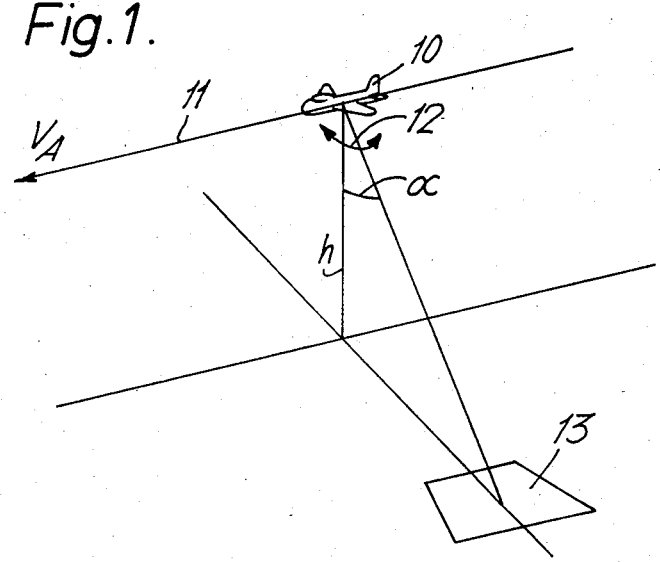
FIG. 1 is a schematic view illustrating one application of the system.
Figure 2:
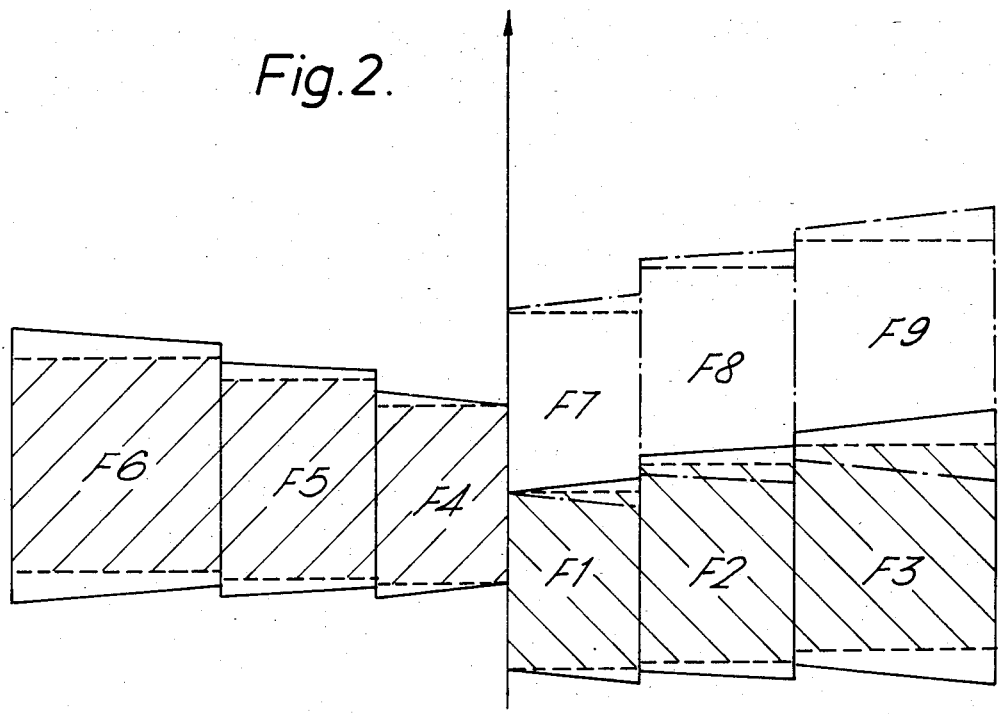
FIG. 2 illustrates the manner in which successive frames may be combined.

Referring now to FIG. 1, this is a schematic view of one application of the invention. This shows an aircraft 10 flying along a flight path 11 at a height h above the ground. The aircraft carries an electro-optic sensor which is able to move in a direction perpendicular to the flight path 11 as shown by the arrow 12. The combination of the forward movement of the aircraft at a velocity $V_A$, and the sideways scanning of the sensor in a series of discrete steps allows an area of ground 13 to be scanned by the sensor. The sensor is moved to a number of predetermined positions, identified conveniently by the elevation angle $\alpha$ of the centre of the field of view. FIG. 2 illustrates the effect of such a procedure, assuming that the scanner is able to move to three positions on each side of the centre-line of the aircraft FIG. 2 shows how each area viewed by the sensor, or "frame", is of different size depending upon the elevation angle. Nine successive frames are shown, and the cross-hatched areas in each show how the images are to be combined to give a mosaic covering the entire area to be scanned. Clearly frames viewed at different elevation angles present different views of the area covered, and this is particularly noticeable if the aircraft is flying at low altitude. The requirement is to provide a uniform view of the area, frequently a plan view, and hence the information obtained by the sensor will have to be corrected.

Figure 3:
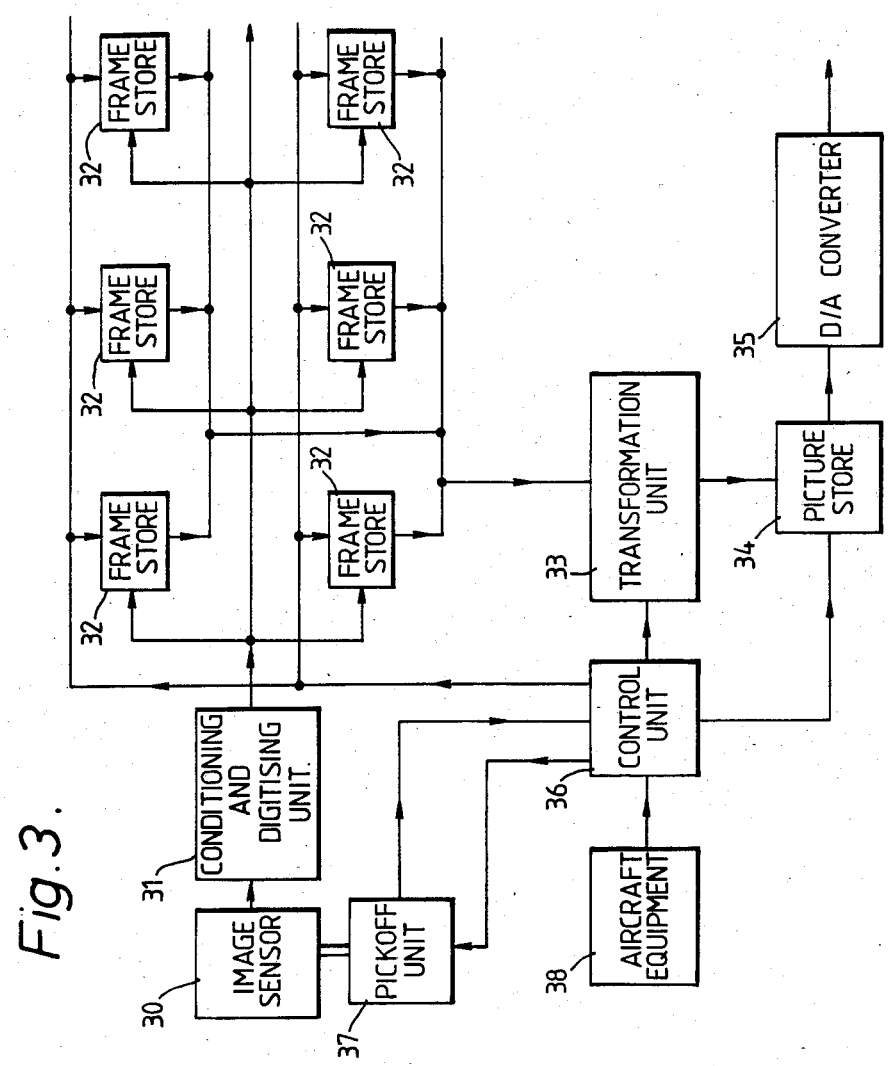
FIG. 3 is a block schematic diagram of an embodiment of the invention.

FIG. 3 is a block schematic diagram of one form of the image correction system. The image sensor 30 provides an analogue output signal which is passed to a conditioning and digitising unit 31. Each successive frame of digitised information is stored in a separate one of a number of frame stores 32.

Information is extracted from each frame store 32 in turn and passed to a transformation unit 33 which applies the appropriate corrections to the position of each pixel of information in that store. The transformed information is passed to a high resolution picture store 34 which holds a number of frames to make up a complete view. The contents of the picture store 34 are passed through a digital-to-analogue converter 35 to provide a video signal for display or other purposes.

The transformation unit 33 may conveniently be a microprocessor which uses a number of algorithms to perform the pixel transformation. Information has to be supplied to a control unit 36 from pickoffs in the sensor drive and pickoff unit 37 indicating the elevation angle of the sensor, and from aircraft equipment 38 indicating the altitude, height and speed of the aircraft. The control unit applies the necessary control signals to the transformation unit 33, the sensor drive and pickoff unit 37 and other elements of the system.

Figure 4:
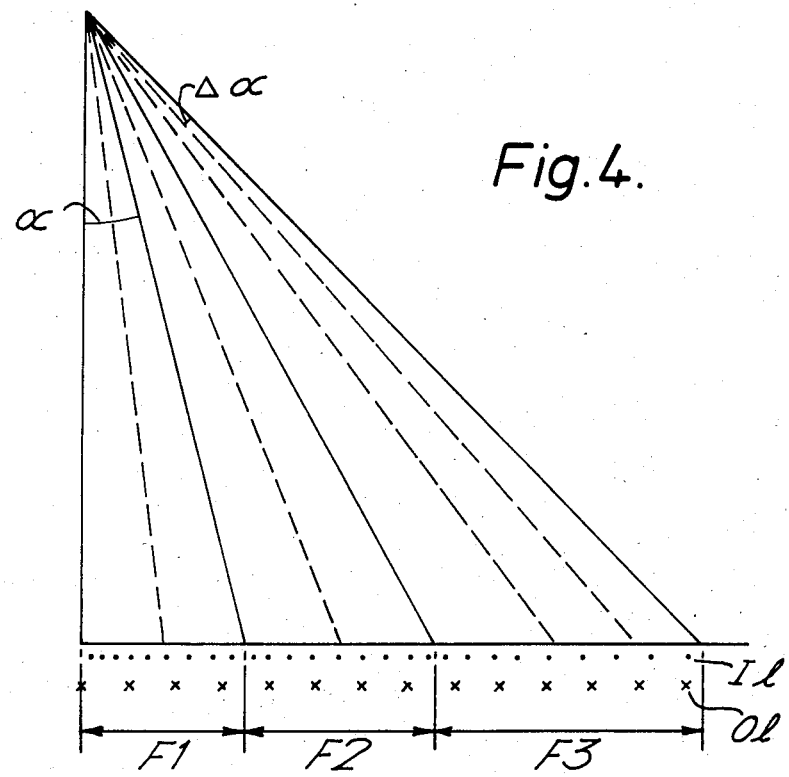
FIGS. 4 and 5 illustrate the principle of operation of the image transformation circuit means.

The determination of the transformation algorithms for one particular set of conditions will now be described. It is assumed that a plan view of an area of ground is to be displayed, in which case lines of equal length on the ground must be translated into lines of equal length on the display. For the purpose of this explanation a number of other assumptions will be made, and will be detailed as they arise. The first assumption is that the sensor has a field of view of 20° in azimuth and 15° in elevation, the elevation angle of the sensor having three preset values of 7.5°, 22.5° and 37.5°. Thus the area scanned is from a line vertically under the sensor to one at an elevation angle of 45°. If the sensor is at a height of 1000 m above the ground, then the sensor covers an area 1 km wide. FIG. 4 shows the three frames F1, F2 and F3 viewed in succession by the sensor, with the preset elevation angles shown by broken lines.

Also shown in FIG. 4 are the positions of some of the scan lines. Each will be separated from the next by an increment of elevation angle $\Delta\mu$, and hence the image lines IL on the ground will be separated by different distances as shown. However, the output lines OL on the display must be equally spaced. Line selection therefore involves selecting only those image lines IL which coincide with, or are nearest to, output lines OL. This may be done, for example, by determining, one at a time, the position of each output line. This may be defined by the depth of the frame multiplied by the output line number divided by the total number of output lines in the frame. The position of each image line is compared with the current output line position, and when the position of an image line crosses the output line position then that image line is selected. The output line position is then incremented and the procedure repeated for each successive output line.

Figure 5:
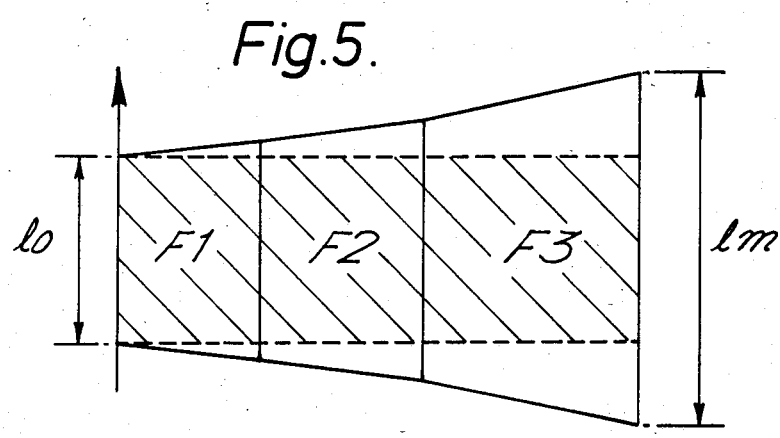

Assuming also, for the sake of simplicity, that the sensor is stationary, then the shape of the area viewed will be as shown in FIG. 5, rather than as described previously with reference to FIG. 2. The shaded areas in FIG. 5 will be those used in the final display. It will be seen that whereas the line lo to be displayed from frame F1 directly under the path of the sensor is of the same length as the width of the area to be displayed, at the other extreme, the outer edge of frame F3, the line lo to be displayed is only a fraction of the width lm of the area scanned. The length L of a framing sensor line projected on the ground is given by $$L = 2H \sec \mu \tan \alpha/2$$

where H is the height of the sensor above the ground, $\mu$ is the angle of elevation to the centre of the field of view, and $\alpha$ is the angular width of the field of view.

Hence for the shortest line lo, $$L = 2H \sec 0° \tan 20°/2$$
$$= 0.352H$$

whilst for the longest line lm $$L = 2H \sec 45° \tan 10°$$
$$= 0.498H.$$

Each of these lines, and all of those in between, contain the same number of pixels p. In the case of the shortest line all pixels are displayed. However, for the longest line lm, only those pixels on the central portion of the line of length lo are required. If the required number of pixels in any line is pc, then $$pc = p \cdot \frac{2H \sec 0° \tan 10°}{2H \sec \alpha \tan 10°}$$

$$= p \cos \alpha$$

hence, for example, when $\alpha = 37.5°$ then pc=0.793p

Pixel selection is therefore carried out as follows: for the frame being processed, the above expression is used to determine the number of pixels in the central scan line at the frame. A relationship exists between the number of pixels in each scan line of the frame, and a correction is applied to each line to determine the number of pixels to be used for the display. Any pixels not required will be those at the ends of the scan lines. This procedure is repeated for each selected line from the frame, the linear relationship being different for each frame.

The simplifying assumption of a stationary sensor made above does not necessarily hold in practice. Clearly, with the sensor moving over the ground the frames are not of the symmetrical shape shown in FIG. 5, but are as illustrated in FIG. 2. The techniques used to select scan lines and pixels still apply, though the geometry of such selection processes may vary.

In operation, the scanning of the sensor and processing of the image data is a continuous process. The sensor is moved to the desired elevation angle by control means not shown in FIG. 3. This involves moving the sensor rapidly between one position and the next, and controlling the direction of the frame scan information to the appropriate frame store.

Figure 6:
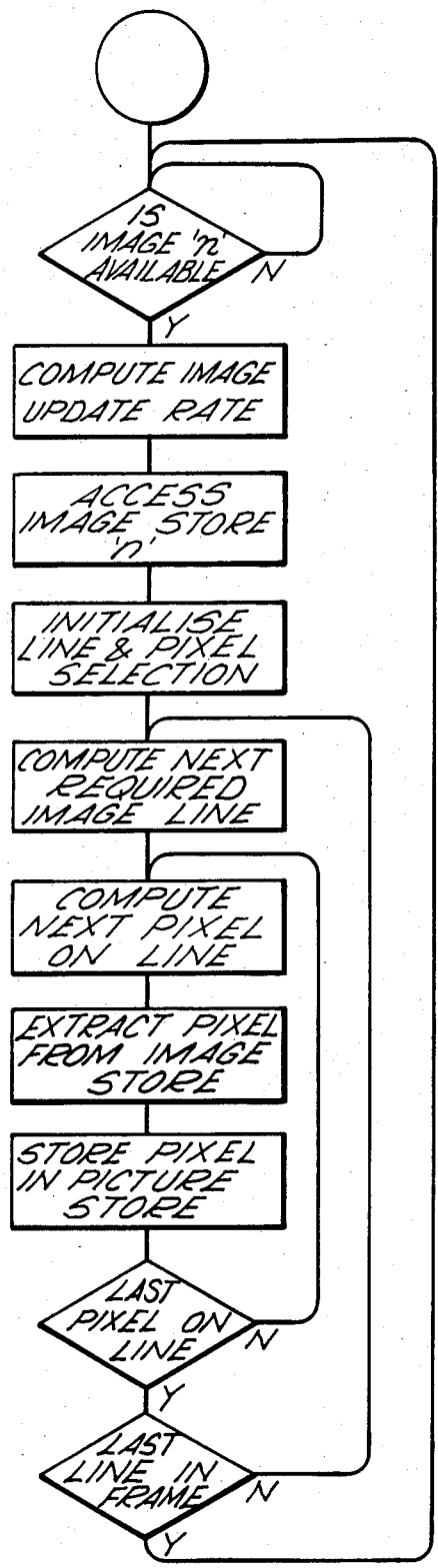
FIG. 6 is a flow chart illustrating the operation of the image transformation circuit means.

FIG. 6 is a flow chart illustrating the sequence of events followed in processing the information stored in each frame store 32. After determining that image information is available in a frame store, the image update rate is determined from data including the height above the ground and the speed of the aircraft carrying the sensor. If information is available then the appropriate frame store is accessed by the processor. After initialising the line and pixel positions, the next required scan line is determined as explained previously. Once this line is identified each required pixel on that line is identified and passed to the picture store. At the end of the scan line the next line is identified and the pixel selection processor is repeated. This continues until all required image information from that frame store has been used. The next frame store is then identified and the process is repeated.

As already stated the information in the picture store may be displayed or may be passed to some other location for display or further processing. Alternatively the basic sensor output may be transmitted, for example, to a ground station at which the processing may be performed.

The description given above has concerned the tranformation of the image information from an obliquely-viewing sensor into a display representing a plan view of the area being scanned. Clearly the area may be viewed from other angles giving perspective effects. This may involve other processing techniques or modification of the techniques described above.

It may be possible to use the scanner for other purposes during its operation, if time is available during normal scanning. For example it may be possible to study a particular area of ground in more detail than is possible during normal operation.

The availability of all the original image information in stored form allows the ready application of a number of well-known image processing techniques. Standard image transformation techniques may be used, such as Walsh-Hadamard, to reduce the amount of storage required. As the basic selection process described above discards a significant proportion of the available information, group averaging or peak detection may be readily incorporated as examples of enhacing the final displayed image.

Other modifications may be applied to the system without departing from the essential features of the invention.

What we claim is:

1. An image correction system for providing a view of a scene scanned by an electro-optic framing sensor, which includes control means operable to cause the sensor to scan the scene in a number of separate frames each of which is viewed at a different viewing angle relative to a set of datum axes, pickoff means associated with the sensor to produce signals representing the viewing angle of each frame, storage means operable to store the image information derived from each of same frames, circuit means operable to transform the image information contained in each storage means so as to remove distortions caused by the different viewing angles, and a picture store operable to store the transformed image information from each frame of the scan such that the contents of the picture store represent a view of the scene from a predetermined viewing angle.

2. A system as claimed in claim 1 which includes sensor drive means operable to control the attitude of the sensor under and the control of the control means.

3. A system as claimed in claim 2 in which the control means receives signals from the pickoff means and applies these to the circuit means.

4. A system as claimed in claim 3 in which the sensor is mounted in a platform movable relative to the viewed scene about a reference axis system of the platform, the control means also receiving signals indicative of the attitude and velocity of the platform relative to the scene being viewed and the signals from the pickoff means indicating the attitude of the sensor relative to the platform.

5. A system as claimed in claim 1 in which the storage means includes a separate store for storing the image information for each of a predetermined number of frames.

6. A system as claimed in claim 1 in which the circuit means is operable to select for each frame those scan lines containing image information required to be applied to the picture store and to select, for each such scan line, the image information to be applied to the picture store.

* * * * *